US006223258B1

United States Patent
Palanca et al.

(12)

(10) Patent No.: US 6,223,258 B1
(45) Date of Patent: Apr. 24, 2001

(54) METHOD AND APPARATUS FOR IMPLEMENTING NON-TEMPORAL LOADS

(75) Inventors: Salvador Palanca; Vladimir Pentkovski, both of Folsom; Steve Tsai, Rancho Cordova, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/053,528

(22) Filed: Mar. 31, 1998

(51) Int. Cl.⁷ ...................................................... G06F 12/12
(52) U.S. Cl. ............................................. 711/138; 711/133
(58) Field of Search .................................. 711/118, 133, 711/138

(56) References Cited

U.S. PATENT DOCUMENTS

| 5,404,484 | * | 4/1995 | Schlansher et al. | .................. 395/425 |
| 5,630,075 | * | 5/1997 | Joshi et al. | ............................ 395/250 |
| 5,829,026 | * | 10/1998 | Leung et al. | .......................... 711/122 |

OTHER PUBLICATIONS

Visual Instruction Set (VIS) User's Guide, Sun Microsystems, version 1.1, Mar. 1997, pp. 1–127.
AMD–3D Technology manual, /Rev. B, Feb. 1998, pp. 1–58.
The UltraSPARC Processor—Technology White Paper The UltraSPARC Architecture, Sun Microsystems, Jul. 17, 1997, pp. 1–10.
21164 Alpha microprocessor Data Sheet, 1997 Samsung Electronics, pp. 1–77.
TM1000 Preliminary Data Book, (Tri Media), 1997, Philips Electronics.

* cited by examiner

*Primary Examiner*—Kevin L. Ellis
(74) *Attorney, Agent, or Firm*—Blakely, Sokoloff, Taylor & Zafman LLP (57) ABSTRACT

A processor is described. The processor includes a decoder to decode instructions and a circuit, in response to a decoded instruction, to detect an incoming load instruction that misses a cache, allocate a buffer to service the incoming load instruction, and issue a bus request to load the data in the buffer without accessing said cache.

18 Claims, 4 Drawing Sheets

METHOD AND APPARATUS FOR IMPLEMENTING NON-TEMPORAL LOADS

BACKGROUND OF THE INVENTION

1. Field of the Invention

The present invention relates generally to the field of processors, and specifically, to a method and apparatus for implementing non-temporal loads.

2. Background Information

The use of a cache memory with a processor is well known in the computer art. A primary purpose of utilizing cache memory is to bring the data closer to the processor in order for the processor to operate on that data. It is generally understood that memory devices closer to the processor operate faster than memory devices farther away on the data path from the processor. However, there is a cost trade-off in utilizing faster memory devices. The faster the data access, the higher the cost to store a bit of data. Accordingly, a cache memory tends to be much smaller in storage capacity than main memory, but is faster in accessing the data.

A computer system may utilize one or more levels of cache memory. Allocation and de-allocation schemes implemented for the cache for various known computer systems are generally similar in practice. That is, data that is required by the processor is cached in the cache memory (or memories). If a cache miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

Recently, there has been an increase in demand on processors to provide high performance for graphics applications, especially three-dimensional graphics applications. The impetus behind the increase in demand is mainly due to the fact that graphics applications tend to cause the processor to move large amounts of data (e.g., display data) from cache and/or system memory to a display device. This data, for the most part, is used once or at most only a few times (referred to as "non-reusable data").

For example, assume a cache set with two ways, one with data A and another with data B. Assume further that data A, data B, and data C target the same cache set, and assume also that a program reads and writes data A and data B multiple times. In the middle of the reads and writes of data A and data B, if the program performs an access of non-reusable data C, the cache will have to evict, for example, data A from way one and replace it with data C. If the program then tries to access data A again, a cache "miss" occurs, in which case data A is retrieved from external memory and data B is evicted from way two and replaced with data A. If the program then tries to access data B again, another cache "miss" occurs, in which case data B is retrieved from external memory and data C is evicted from way one and replaced with data B. Since data C is non-reusable by the program, this procedure wastes a considerable amount of clock cycles, decreases efficiency, and pollutes the cache.

Therefore, there is a need in the technology for a method and apparatus to efficiently read non-reusable data from external memory without polluting cache memory.

SUMMARY OF THE INVENTION

The present invention is a processor. The processor includes a decoder to decode instructions and a circuit, in response to a decoded instruction, to detect an incoming load instruction that misses a cache, allocate a buffer to service the incoming load instruction, and issue a bus request to load the data in the buffer without accessing said cache.

BRIEF DESCRIPTION OF THE DRAWINGS

The features and advantages of the present invention will become apparent from the following detailed description of the present invention in which.

DERAILED DESCRIPTION

The present invention is a method and apparatus for implementing non-temporal loads. In the following description, for purposes of explanation, numerous details are set forth in order to provide a thorough understanding of the present invention. However, it will be apparent to one skilled in the art that these specific details are not required in order to practice the present invention.

As hereinafter described, non-temporal data refers to data that is intended to be used once or at most a few times by the processor whereas temporal data is data that is intended to be used more than non-temporal data (e.g., used repeatedly). Moreover, weakly-ordered instructions are instructions that can be executed out of program order, i.e., a M-th sequential instruction in a program may be executed before a (M–N)-th sequential instruction (where M and N are positive whole numbers and M>N). On the other hand, strongly ordered instructions are instructions that are executed in program order. A line of data refers to thirty-two bytes of data, as presently utilized in microprocessor-based systems, although it is within the scope of the present invention if a line of data refers to more or less bytes of data.

A cache "hit" occurs when the address of an incoming instruction matches one of the valid entries in the cache. For example, in the MESI protocol, a line in the cache has a valid entry when it is in modified "M", exclusive "E", or shared "S" state. A cache "miss" occurs the address of an incoming instruction does not match any valid entries in the cache. For sake of clarity, the cache is described with respect to the MESI protocol, however, other protocols or cache consistency models may be used. Write combining is the process of combining writes to the same line in a buffer, therefore diminishing the number of external bus transactions required.

Figure 1:
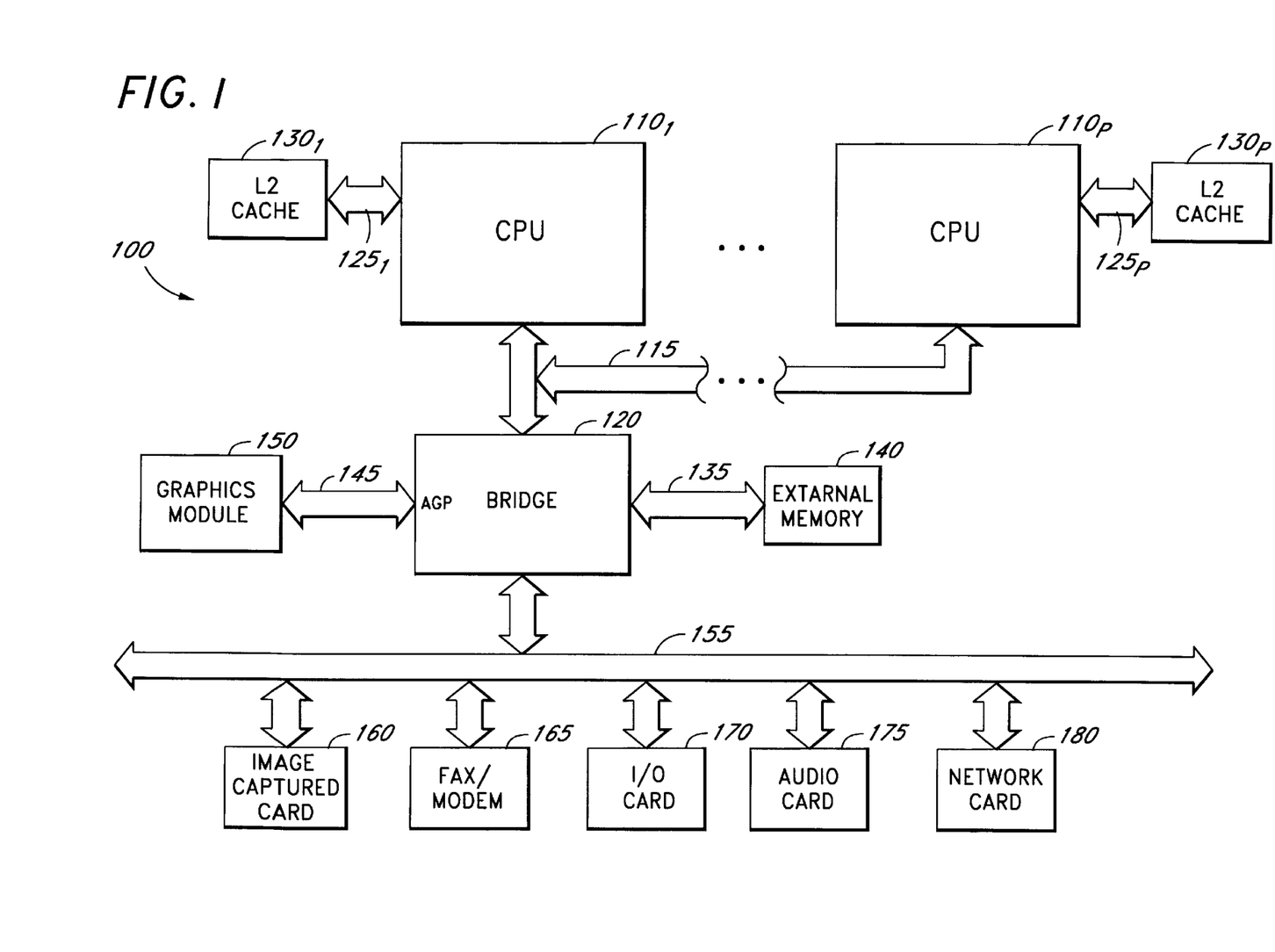
FIG. 1 illustrates an exemplary embodiment of a computer system 100) in accordance with the teachings of the present invention.

FIG. 1 illustrates an exemplary embodiment of a computer system 100 in accordance with the teachings of the present invention. Referring to FIG. 1 computer system 100 comprises one or more central processing units ("CPUs") $110_1$–$110_P$ (where P is a positive whole number), coupled to a bridge 120 by way of a host bus 115. Each CPU 110 is also coupled to a Level 2 ("L2") cache 130 by way of a backside bus 125. Each CPU 110 may be of any type, such as a complex instruction set computer ("CISC"), reduced instruction set computer ("RISC"), very long instruction word ("VLIW"), or hybrid architecture. In addition, each CPU 110 could be implemented on one or more chips. Through an AGP port, the bridge 120 is coupled to a graphics module 150 by way of a graphics bus 145. The bridge is also coupled to external memory 140 (e.g., static random access memory "SRAM", dynamic RAM "DRAM", etc.) by way of an external bus 135 and an expansion bus 155. In one embodiment, the expansion bus 155 is, for example, a peripheral component interconnect ("PCI") bus, an Extended Industry Standard Architecture ("EISA") bus, or a combination of such busses.

A number of peripheral devices including an image capture card 160, fax/modem card 165, input/output ("I/O") card 170, audio card 175, network card 180, and the like, may optionally be coupled to the expansion bus 155. The image capture card 160 represents one or more devices for digitizing images (i.e., a scanner, camera, etc.). The fax/modem card 165 represents a fax and/or modem for receiving and/or transmitting analog signals representing data. The audio card 175 represents one or more devices for inputting and/or outputting sound (e.g., microphones, speakers, etc.). The network card 180 represents one or more network connections (e.g., an Ethernet connection). However, it must be noted that the architecture of computer system 100 is exemplary and is apparent to one skilled in the art that such architecture is not critical in practicing the present invention.

Figure 2:
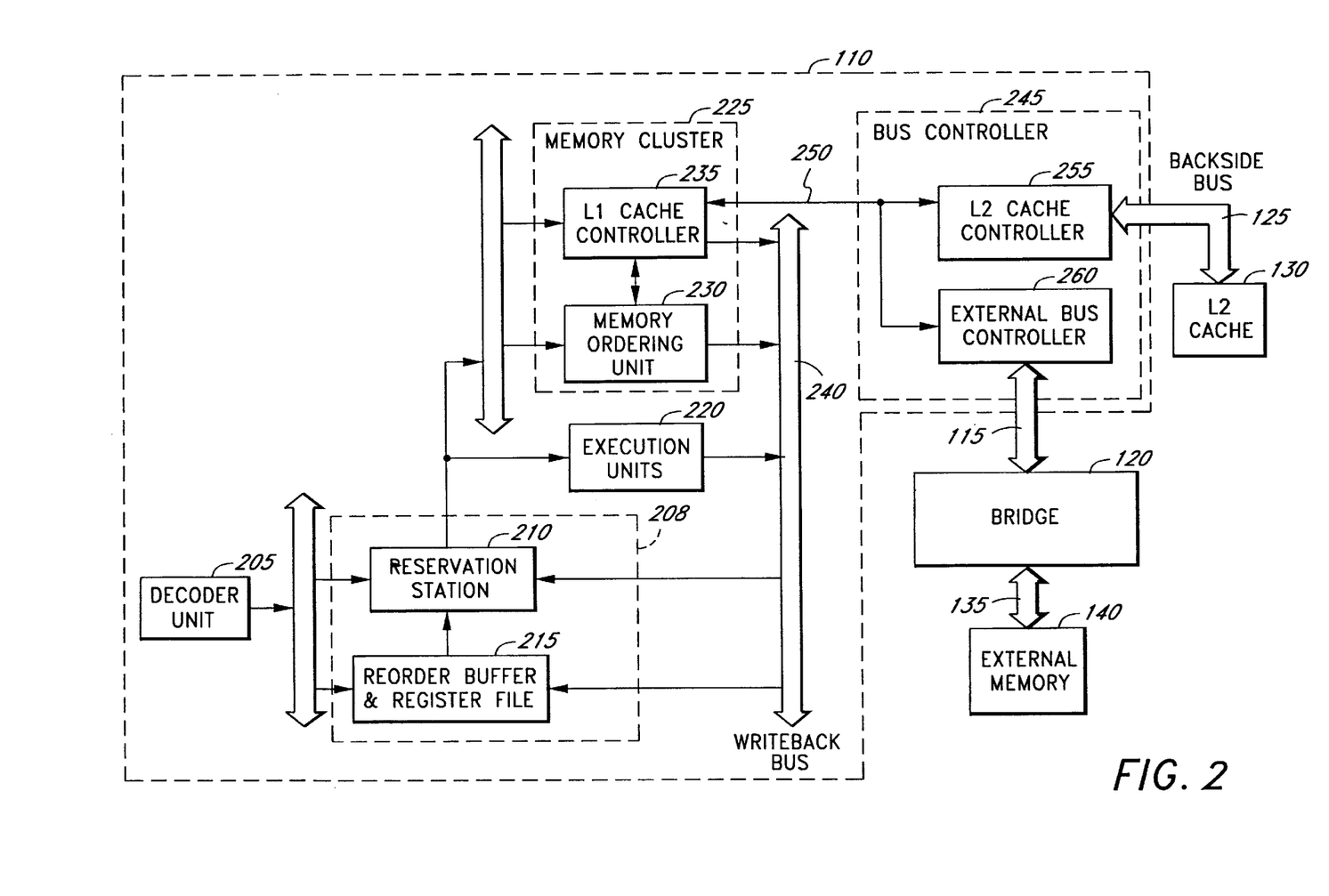
FIG. 2 illustrates exemplary structures of the CPU implementing a multiple cache arrangement.

FIG. 2 illustrates exemplary structures of the CPU 110 implementing a multiple cache arrangement. Referring to FIG. 2, the CPU 110 includes, among other things, a decoder unit 205, a processor core 208, execution units 220, a memory cluster 225 having a memory ordering unit ("MOU") 230 and a Level 1 ("L1") cache controller 235, and a bus controller 245 having a L2 cache controller 255 and an external bus controller 260. In one embodiment, the CPU 110 is an out-of-order processor, in which case the processor core 208 includes a reservation station 210 and a logical block having a reorder buffer and a register file 215. It is to be noted that there are other well known or new out-of-order execution architectures. However, in another embodiment, the CPU 110 is an in-order processor, in which case the reservation station 210 and/or the reorder buffer may not be needed. In either case, the present invention operates with any type of processor (e.g., out-of-order, in-order, etc.). For clarity sake, all references made to the reorder buffer and/or the register file will be designated by numeral 215, even though they are separate logical units within the logical block 215. The register file 215 includes a plurality of general purpose registers. It is to be appreciated that the CPU 110 actually includes many more components than just the components shown. Thus, only those structures useful to the understanding of the present invention are shown in FIG. 2.

The decoder unit 205 decodes instructions and forwards them to the reservation station 210 and the reorder buffer 215 of the processor core 208. The processor core 208 is coupled to the execution units 220 and the memory cluster 225 for dispatching instructions to the same. The memory cluster 225 writes back information to the processor core 208 by way of a writeback bus 240. The L1 cache controller 235 is coupled to the L2 cache controller 255 and the external bus controller by way of a bus 250. The L2 cache controller 255 controls the L2 cache 130, and the external bus controller 260 interfaces with external memory 140 through the bridge 120.

Figure 3:
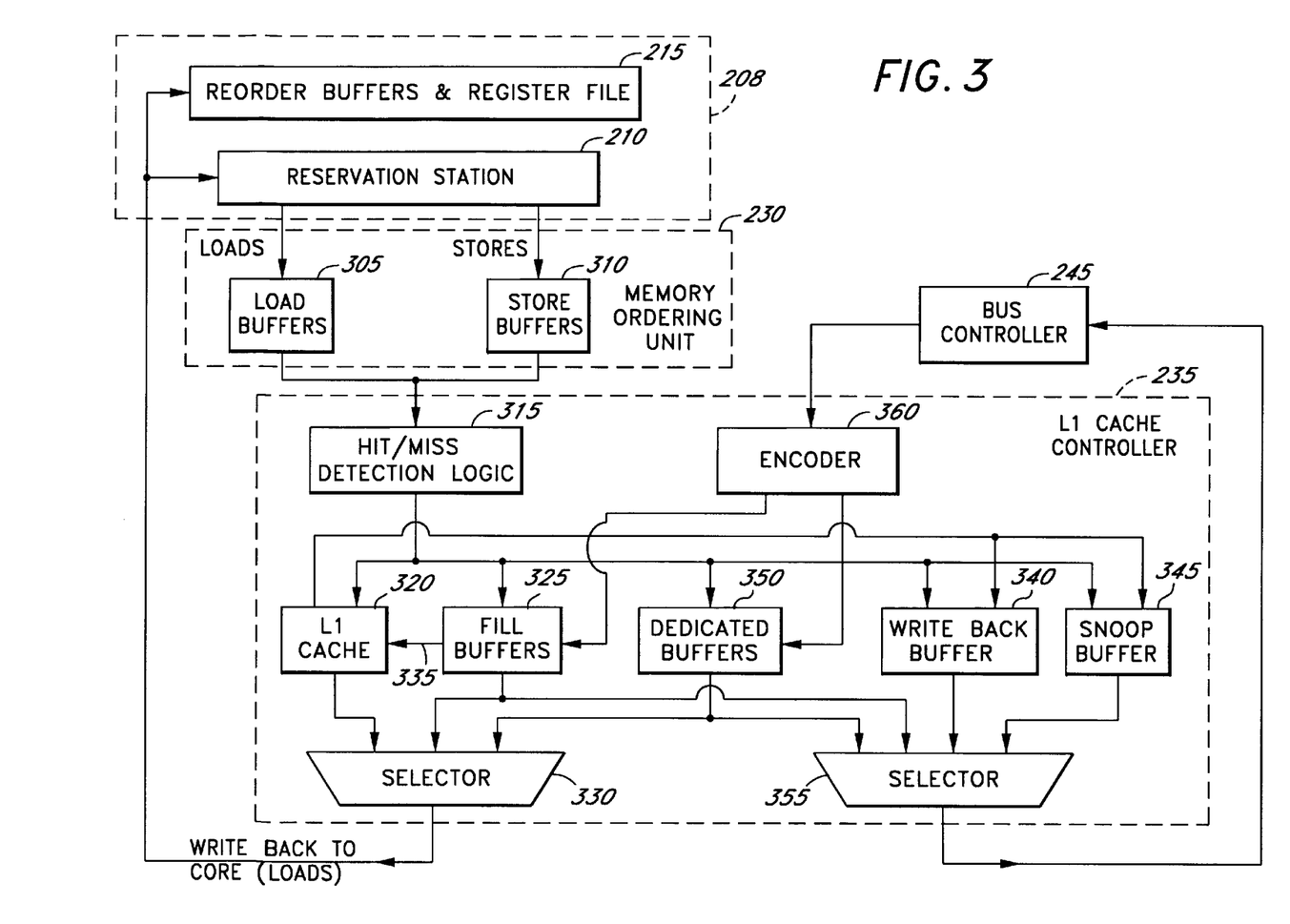
FIG. 3 illustrates exemplary logical units of the memory ordering unit and the L1 cache controller and the interconnection therebetween.

FIG. 3 illustrates exemplary logical units of the memory ordering unit 230 and the L1 cache controller 235 and the interconnection therebetween. Referring to FIG. 3, the MOU 230 includes a load buffer 305 which buffers a plurality (e.g., 16 entries) of load (or read) instructions (or requests) and a store buffer 310 which buffers a plurality (e.g., 12 entries) of store (or write) instructions. Alternatively, the MOU 230 may use a single unified buffer which buffers both load and store instructions. The addresses of the load and store instructions are transmitted to, among other things, a hit/miss detection logic 315 of the L1 cache controller 235. The hit/miss detection logic 315 is coupled to a L1 cache 320, a plurality of L1 cache controller buffers 325 (each hereinafter referred to as a "fill buffer"), a plurality of dedicated buffers 350, a write back buffer ("WBB") 340, and a snoop buffer ("SB") 345. The hit/miss detection logic 315 determines whether the incoming instructions "hit" either the L1 cache 320, fill buffers 325, dedicated buffers 350, WBB 340, or SB 345 (e.g., performs an address comparison).

The L1 cache 320, fill buffers 325 (e.g., four buffers), and dedicated buffer 350 are coupled to a selector 330 (e.g., a multiplexer) for returning data back to the reservation station 210 and/or the reorder buffer and register file 215 of the processor core 208. The fill buffers 325 are also coupled to the L1 cache 320 by way of bus 335 to write data to the L1 cache 320. The L1 cache 320 is coupled to the WBB 340 and the SB 345. In addition, the fill buffers 325, dedicated buffers 350, WBB 240, and SB 345 are coupled to a second selector 355 for writing data to the bus controller 245. The bus controller 245 is coupled through an encoder 360 to the fill buffers 325 and dedicated buffers 350 for writing data to the same.

Continuing to refer to FIG. 3, the WBB 340 is used to write a line of data that is in the M state, which has been evicted from the L1 cache 320, to external memory 140. The SB 345 is used when the CPU 110 receives an external snoop from another CPU in the system (e.g., CPUs $110_2$–$110_P$), and the result of the snoop is that it "hits" a line in M state in the L1 cache 320 (i.e., L1 cache of CPU 110). The external snoop is the result of another CPU in the system trying to access the same line that is in the M state in the L1 cache of CPU 110. After the snoop "hit", the CPU 110 places the M line in the SB 345, and from there, sends it to external memory. The other CPU in the system, from where the snoop originated, can then access the line from external memory 140.

Loads and stores, which are dispatched to the L1 cache controller 235, have an associated memory type. In one embodiment, each CPU 110 supports five memory types including write back ("WB"), write through ("WT"), uncacheable speculative write combining ("USWC"), uncacheable ("UC"), and write protected ("WP"). An example of a UC memory type is an access to memory mapped I/O. WB memory type is cacheable whereas USWC and UC memory types are uncacheable. WP writes are uncacheable, but WP reads are cacheable. WT reads are also cacheable. WT writes that "hit" the L1 cache 320 update both the L1 cache and external memory, whereas WT writes that "miss" the L1 cache 320 only update external memory. USWC writes are weakly ordered, which means that subsequent instructions may execute out of order with respect to a USWC write or the USWC write may execute out of order with respect to previous instructions. On the other hand, UC stores are strongly ordered, and they execute in program order with respect to other stores.

Figure 4:
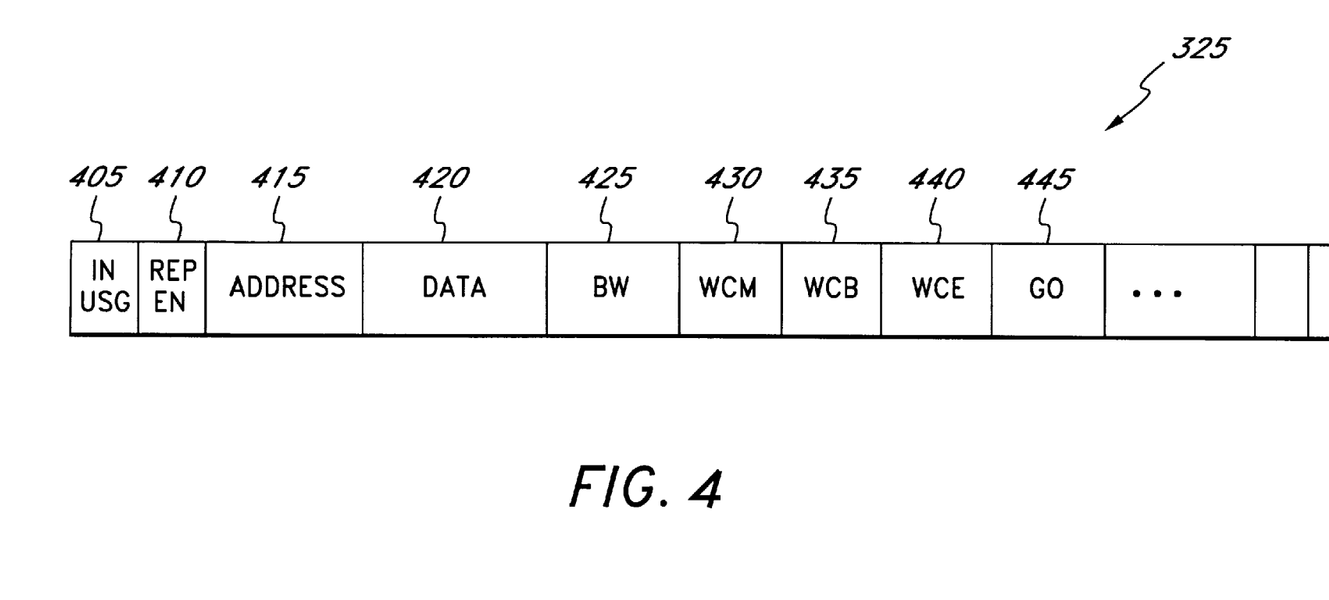
FIG. 4 illustrates various control fields of an exemplary fill buffer suitable for use with the present invention.

FIG. 4 illustrates various control fields of an exemplary fill buffer 325 suitable for use with the present invention. Referring to FIG. 4, the fill buffer 325 includes, among other fields, the following control fields: (i) "In Use" control field 405 which is set when the fill buffer is allocated (e.g., on a L1 read "miss") and cleared when it is deallocated; (ii)

"RepEn" field 410 which specifies whether a line of data that is returned from the bus controller 245 is to be written into the L1 cache 320; (iii) Address field 415 which includes the address of the request; (iv) Data field 420 which includes the data that is returned to the fill buffer on a load request and contains valid data to be written on a store request; (v) Byte written ("BW") field 425 which includes one bit for each byte in the Data field and, for all writes, including those in write combining mode, indicates the bytes within the line which are written by a store from the processor core 208 (e.g., a register); (vi) Write Combining Mode ("WCM") field 430 which specifies whether the fill buffer is in write combining mode; (vii) Write Combining Buffer ("WCB") field 435 which specifies that the buffer is a write combining buffer; (viii) Write Combining Evicted ("WCE") field 440 which specifies whether the write combining buffer is evicted; and (ix) global observation ("GO") field 445 which specifies whether the fill buffer is globally observed.

A fill buffer has the WCM field set before eviction and cleared after eviction has started to indicate that the fill buffer is no longer write combining. In one embodiment, the various control fields of the exemplary fill buffer 325 is the same as the control fields of the dedicated buffers 350 with the exception of the RepEn field 410 since the dedicated buffers do not write data into the L1 cache. However, in another embodiment, the dedicated buffers have the same control fields as the fill buffers.

Upon allocating a fill buffer, if the WCB field is cleared (normal mode), the fill buffer is a non-write combining fill buffer ("NWCFB") and if the WCB field is set the fill buffer is a write combining fill buffer ("WCFB"). In write combining mode, cacheable non-temporal stores (e.g., they are in write combining mode when they "miss" the L1 cache) behave as weakly-ordered write-combining stores in that they can be executed out of order with respect to cacheable instructions and non-strongly ordered uncacheable instructions. If a WCFB is allocated, the fill buffer will remain in write combine mode and not issue a bus request until either the fill buffer is full (i.e., all BW bits are set) or there is an eviction condition. If subsequent write combining writes of the same type "hit" the fill buffer, the writes combine. That is, data (e.g., one, two, four, eight bytes) is transferred from the processor core 208 to the corresponding bytes in the fill buffer 350 and the corresponding BW bits are set. Upon an eviction condition, the WCFB, servicing a USWC store, or WB or WT non-temporal store that "misses" the L1 cache, initiates a request to the bus controller 245 to write the line of data to external memory 140. Strongly ordered uncacheable store and fencing instructions are examples of instructions that are strongly ordered and cause eviction of a WCFB. The fencing instruction is described in co-pending United States Patent Application entitled "Synchronization of Weakly Ordered Write Combining Operations Using a Fencing Mechanism" by Salvador Palanca et al. and assigned to the assignee of the present invention.

Referring back to FIGS. 2 and 3, two separate cache memories 320 and 130 are shown. The caches memories 320 and 130 are arranged serially and each is representative of a cache level, referred to as L1 cache and L2 cache, respectively. Furthermore, the L1 cache 320 is shown as part of the CPU 110, while the L2 cache 130 is shown external to the CPU 110. This structure exemplifies the current practice of placing the L1 cache on the processor chip while higher level caches are placed external to it. The actual placement of the various cache memories is a design choice or dictated by the processor architecture. Thus, it is appreciated that the L1 cache 320 could be placed external to the CPU 110. The caches can be used to cache data, instructions or both. In some systems, the L1 cache is actually split into two sections, one section for caching data and one section for caching instructions. However, for simplicity of explanation, the various caches described in the Figures are shown as single caches with data.

As noted, only two caches 320 and 130 are shown. However, the computer system need not be limited to only two levels of cache. It is now a practice to utilize a third level ("L3") cache in more advanced systems. It is also the practice to have a serial arrangement of cache memories so that data cached in the L1 cache is also cached in the L2 cache. If there happens to be a L3 cache, then data cached in the L2 cache is typically cached in the L3 cache as well. Thus, data cached at a particular cache level is also cached at all higher levels of the cache hierarchy.

As shown in FIG. 1, the computer system 100 may include more than one CPU (i.e., P>1), typically coupled to the system by way of bus 115. In such a system, it is typical for multiple CPUs to share the external memory 140. The present invention can be practiced in a single CPU computer system or in a multiple CPU computer system. It is further noted that other types of units (other than processors) which access external memory can function equivalently to the CPUs described herein and, therefore, are capable of performing the memory accessing functions similar to the described CPUs. For example, direct memory accessing ("DMA") devices can readily access memory similar to the processors described herein. Thus, a computer system having one CPU, but one or more of the memory accessing units would function equivalent to the multiple processor system described herein.

Generally, the decoder unit 205 fetches instructions from a storage location (such as external memory 140) holding the instructions of a program that will be executed and decodes these instructions. The decoder unit 205 forwards the instructions to the processor core 208. In the embodiment shown the instructions are forwarded to the reservation station 210 and the reorder buffer 215. The reorder buffer 215 keeps a copy of the instructions in program order. Each entry in the reorder buffer, which corresponds to a micro-instruction, includes a control field with one bit being a write-back data valid bit. The write-back data valid bit indicates whether an instruction is ready to be retired. The reorder buffer 215 retires the instruction when the instruction has its write-back data valid bit set and when all previous instructions in the reorder buffer have been retired (i.e., in-order retirement). The reservation station 210 receives the instructions and determines their type (e.g., arithmetic logic unit "ALU" instruction, memory instruction, etc.). In one embodiment, the reservation station 210 dispatches instructions in an out of order manner. When the memory cluster 225 or the execution units 220 have completed execution and an instruction is ready to be retired, the reorder buffer 215 retires the instruction when all previous instructions in program order have been retired (i.e., in-order retirement).

For example, for an ALU instruction, the reservation station 210 dispatches the instruction to the execution units 220. The execution units 220 execute the instruction and return the result back to the reorder buffer and the register file 215 so that the result can be written to a register in the register file and the instruction can be retired. Memory instructions, on the other hand, are dispatched to the MOU 230. Load instructions are placed in the load buffer 305 while store instructions are placed in the store buffer 310. The MOU 230 will throttle the reservation station 210 and not accept an instruction if the buffer that the instruction is destined for (e.g., load or store buffer) is full, if there is an abort condition, or on other conditions.

The MOU 230 dispatches instructions (load, store, etc.) to the L1 cache controller 235. Generally, the MOU 230 may dispatch instructions out of order unless dependencies exist. For example, if instruction two is dependent on instruction one and instruction three is independent of both instructions one and two, instruction two has to wait until the result of instruction one is available but instruction three can go ahead since it has no dependencies. Therefore, the MOU 230 may dispatch instruction one, then instruction three, and then instruction two, or alternatively 3, 1, and 2.

Address comparison takes place in the hit/miss detection logic 315 of the L1 cache controller 235. The hit/miss detection logic 315 determines whether the incoming instruction "hits" the L1 cache 320, fill buffers 325, dedicated buffers 350, WBB 340, or SB 345. The L1 cache controller 235 determines, among other things, whether the instruction is cacheable and whether the instruction is a load or store instruction.

Furthermore, in one embodiment, each CPU 110 supports temporal and non-temporal load and store instructions. Temporal load instructions (or temporal loads) follow temporal load semantics. That is, if a cacheable temporal load "hits" a line of data in the L1 cache 320, the data is transferred from the L1 cache 320 to the processor core 208, i.e., through the selector 330 to the reorder buffer and register file 215 by way of the writeback bus 240. Also, the write back data valid bit is set in the reorder buffer 215. The reorder buffer retires the instruction when the write back data valid bit is set and all previous instructions in program order have been retired.

However, if a cacheable temporal load "misses" the L1 cache 320, the L1 cache controller 235 allocates a fill buffer 325 to service the load request. The fill buffer 325 issues a bus request to the bus controller 245 for the line of data. The bus controller 245 first checks the L2 cache 130 to determine whether the data is in the L2 cache 130. If the data is in the L2 cache 130, a L2 cache "hit" occurs and the line is retrieved from the L2 cache, otherwise the line is retrieved from external memory 140. In either case, the line of data is sent back to the fill buffer 325. The fill buffer 325 forwards the data to the L1 cache 320 by way of bus 335. Alternatively, the bus controller 245 sends the data from a L2 cache "hit" simultaneously to both the fill buffer 325 and the reorder buffer and register file 215 by way of the writeback bus 240 (assuming that the writeback bus is available). If the writeback bus 240 is not available, the fill buffer 325 will send the data to the reorder buffer and register file 215 and then to the L1 cache 320.

For an uncacheable temporal load, the fill buffer issues a bus request to the bus controller 245 for the length of the request. The bus controller 245 retrieves the data from external memory 140. At the same time, the L1 and L2 caches are self-snooped and flushed. When the data is returned to the fill buffer 325, the data is forwarded to the processor core 208, but not to the L1 cache 320. Similar to uncacheable temporal loads, uncacheable non-temporal loads follow temporal load semantics.

In one embodiment, the fill buffers 325 services cacheable instructions that "miss" the L1 cache, uncacheable instructions (e.g., UC), and write combining instructions (e.g., USWC). The dedicated buffers 350 service non-temporal load instructions that "miss" the L1 cache. In addition, the dedicated buffers can help off load requests to the fill buffers by servicing uncacheable and write combining instructions (e.g., any instruction that does not affect the L1 cache).

Of particular interest to the present invention are cacheable non-temporal loads (also hereinafter referred to as "streaming loads") which follow non-temporal load semantics. For example, if a cacheable non-temporal load "hits" a line of data in the L1 cache 320 (note that the line of data that is "hit" must have been brought into the L1 cache as temporal data), a biased least recently used ("LRU") algorithm is used to minimize pollution in the cache, as described in co-pending United States Patent Application entitled "Shared Cache Structure for Temporal and Non-Temporal Instructions" by Salvador Palanca et al. and assigned to the assignee of the present invention.

If a cacheable non-temporal load "misses" the L1 cache, a dedicated buffer 350 is allocated to service the load request. In one embodiment, all cacheable non-temporal loads that "miss" the L1 cache are exclusively serviced by the dedicated buffers 350. The dedicated buffer 350 issues a bus request to the bus controller 245 to retrieve the line of data. The bus controller 245 includes a mode bit which determines whether to perform serial or parallel L2 lookup, as described in co-pending United States Patent Application entitled "Method and Micro-Architectural Apparatus for Prefetching Data into Cache" by Salvador Palanca et al. and assigned to the assignee of the present invention. After the dedicated buffer 350 issues a bus request, the bus controller 245 signals that the dedicated buffer is globally observed.

Global observation occurs when the line of data (1) is found in the L2 cache, (2) is found in a cache of another processor (in the case of a multiprocessor system), or (3) when the line is neither found in the L2 cache nor in a cache of another processor (i.e., the data is in external memory). Thereafter, the dedicated buffer 350 receives the data from the bus controller 245. The dedicated buffer 350 forwards the data to the processor core 208 without sending the data to the L1 cache since the instruction is a non-temporal instruction. Moreover, the dedicated buffer remains valid unless there is a deallocation condition (see below). That is, data is forwarded from the dedicated buffer (e.g., to the processor core 208 ) on subsequent loads that "hit" the dedicated buffer.

If the dedicated buffer 350 supports cacheable non-temporal loads exclusively, the data is never evicted from the dedicated buffer 350. Rather, the data in the dedicated buffer is invalidated upon a store or an uncacheable load "hit" to the dedicated buffer, on an incoming non-temporal load that "misses" the L1 cache and all of the dedicated buffers 350 are full, or on a "Go to I" snoop hit (e.g., another processor in a multiprocessor system is writing to the same line). In the case of a store or an uncacheable load hit to the dedicated buffer 350, the dedicated buffer is invalidated and a fill buffer 325 is simultaneously allocated to service the store or the uncacheable load request, if there are no blocking conditions.

Table 1 illustrates the behavior of incoming streaming loads. The "Op" column defines the type of incoming instruction, in this case, non-temporal or streaming loads ("SL"), the "Mem type" column describes the memory type, and the "Hit/Miss" column describes whether there is a "hit" or a "miss" to the WBB, SB, fill buffers, dedicated buffer, or L1 cache. In one embodiment, dedicated buffers 350 only support streaming loads. In another embodiment, dedicated buffers also support WB and WT non-temporal stores that "miss" the L1 cache and USWC stores, all of which are weakly-ordered write combining stores and when evicted, they transfer the data, which was written from the processor core 208, from the fill buffer 325 to external memory 140. Unless otherwise specified, Table 1 and the corresponding subsequent description assumes that the dedicated buffer is allocated to service a streaming load.

TABLE 1

| Row | Op | Mem type | Hit/ Miss | Action | Comments |
|---|---|---|---|---|---|
| 1 | SL | All | Hit WBB or SB | Block incoming SL. | No change with respect to regular or temporal stores. |
| 2 | SL | WB WT WP | Hit fill buffer | Forward data to core if fill buffer: (1) is globally observed; (2) has valid data and (3) is servicing a cacheable read that "misses" the L1 cache and the corresponding RepEn control bit is set. Otherwise, block incoming SL. | If the buffer is in write combining mode, the incoming SL will be blocked and will cause the write combining fill buffer to be evicted. The SL is allocated into a dedicated buffer once eviction completes and the fill buffer is deallocated. |
| 3 | SL | USWC UC | Hit fill buffer | Block incoming SL. | |
| 4 | SL | WB WT WP | Hit dedicated buffer | Data is forwarded if the dedicated buffer is globally observed and has valid data, otherwise the incoming SL is blocked. | If the buffer is in write combining mode, the incoming SL will be blocked and will cause the write combming buffer to be evicted. Note that in write combining mode, the GO control bit is cleared, therefore, data is not forwarded to the incoming SL, which is blocked. |
| 5 | SL | USWC UC | Hit dedicated buffer | Block incoming SL. | |
| 6 | SL | WB WT WP | Hit L1 cache | Same as temporal load semantics. L1 cache is updated based on the biased LRU algorithm. | A streaming load can only hit the L1 cache if the data was previously brought into the L1 cache as temporal data. |
| 7 | SL | USWC UC | Hit L1 | Cannot happen unless there is memory aliasing. | |

In a first scenario, if an incoming cacheable streaming load instruction "hits" either the WBB or SB (Row 1), the streaming load instruction is blocked until the WBB or SB finishes writing the line of data to external memory and is deallocated. In a second scenario, if an incoming cacheable (e.g., WB, WT, or WP) streaming load instruction "hits" a fill buffer (Row 2), the data is sent back to the processor core 208 if the fill buffer (1) is globally observed, (2) has valid data, and (3) is servicing a cacheable load that "missed" the L1 cache and the corresponding RepEn bit is set, otherwise the incoming streaming load instruction is blocked until the fill buffer is deallocated. The fill buffer 325 has valid data when the bus controller 245 sends the line of data to the fill buffer. The last requirement ensures that the fill buffer is servicing a cacheable request since data cannot be forwarded to the processor core 208 from the fill buffer when servicing an uncacheable request (e.g., USWC or UC). If the fill buffer is in write combining mode, the incoming streaming load instruction will be blocked and will evict the write combining fill buffer. The incoming streaming load instruction is allocated into a dedicated buffer 350 once eviction completes and the fill buffer 325 is deallocated.

In a third scenario, if an incoming uncacheable streaming load instruction (e.g., USWC or UC) "hits" a fill buffer (Row 3), it is blocked until the fill buffer is deallocated (i.e., serialized). Once the fill buffer is deallocated, a fill buffer is allocated to service the incoming uncacheable streaming load instruction.

In a fourth scenario, if an incoming cacheable streaming load instruction "hits" a dedicated buffer (Row 4), the data is forwarded to the processor core 208 if the dedicated buffer is globally observed and has valid data, otherwise the incoming streaming load is blocked and reissued upon the dedicated buffer having valid data. However, if the dedicated buffer is in write combining mode, the incoming streaming load instruction will be blocked and will cause eviction of the write combining dedicated buffer. It is important to note that in write combining mode, the GO control bit is cleared. Therefore, data is not forwarded to the incoming streaming load instruction, which is blocked.

In a fifth scenario, if an incoming uncacheable streaming load instruction "hits" a dedicated buffer (Row 5), the incoming instruction is blocked until the dedicated buffer has completed servicing the cacheable streaming load instruction. Thereafter, the dedicated buffer is invalidated and deallocated, and simultaneously a fill buffer is allocated to service the uncacheable streaming load instruction.

In a sixth scenario, if an incoming cacheable streaming load instruction "hits" a line in the L1 cache (Row 6), temporal load semantics are followed except that a biased LRU algorithm is used to minimize cache pollution, as described in co-pending United States Patent Application entitled "Shared Cache Structure for Temporal and Non-Temporal Instructions" by Salvador Palanca et al. and assigned to the assignee of the present invention. It is important to note that a streaming load instruction can only "hit" the L1 cache if the data was previously brought into the L1 cache as temporal data. UC or USWC streaming load instructions cannot hit the L1 cache (Row 7), unless they are memory aliased. Memory aliasing occurs when the same line of data can be accessed by two instructions having different memory types. Since USWC memory types are not aliased and only access external memory, it implies that USWC requests can never "hit" the caches. Therefore, no self-snooping is needed upon issuing the request to the bus controller 245. Thus, on an incoming USWC or UC streaming load, a fill buffer 325 is allocated to service the streaming load instruction and, upon issuing a bus request to the bus controller 245, the L1 and L2 caches 320 and 130 are flushed (only for UC). If other embodiments allow USWC aliasing, self-snooping directives to flush the L1 cache and L2 cache would be necessary.

Table 2 illustrates the behavior of incoming instructions upon "hitting" a dedicated buffer which has been allocated to service a cacheable streaming load instruction. In this embodiment, the dedicated buffers exclusively support cacheable streaming load instructions. The "Op" column defines the type of incoming instruction (e.g., load, store, prefetch) and the "C/NC" column describes whether the incoming instruction is cacheable or uncacheable.

TABLE 2

| Row | Op | C/UN | Action |
|---|---|---|---|
| 1 | All | UN | Invalidate line in the dedicated buffer and simultaneously allocate fill buffer to service uncacheable request if the original SL request in the dedicated buffer has completed, otherwise block the incoming instruction. |
| 2 | Load | C | Data is forwarded to the core if the dedicated buffer has valid data, otherwise block the incoming instruction. |
| 3 | Store | C | Invalidate line in the dedicated buffer and simultaneously allocate fill buffer to service the request as a L1 cache "miss" if the original SL request in the dedicated buffer has completed, otherwise block the incoming instruction. |
| 4 | Prefetch | C | No action, retire instruction. |

TABLE 3

| Row | Op | C/UN | Action |
|---|---|---|---|
| 1 | All | UN | If the dedicated buffer is in write combining mode, incoming USWC stores write combine with the dedicated buffer. Any other uncacheable request will be blocked and evict the write combining buffer. |
| 2 | Load | C | If the dedicated buffer is in write combining mode, the dedicated buffer is evicted and the incoming cacheable load instruction is blocked. |
| 3 | Store | C | If the buffer is in write combining mode, incoming non-temporal stores write combine with the dedicated buffer. Any other cacheable stores are blocked and evict the write combining buffer. |
| 4 | Prefetch | C | If the dedicated buffer is in write combining mode, the incoming prefetch is blocked and evicts the dedicated buffer. |

In a first scenario (Row 1), if an incoming uncacheable instruction "hits" a dedicated buffer that is servicing a cacheable streaming load instruction, the incoming instruction is blocked until valid data is returned to the dedicated buffer and the data is written to the processor core 208. Thereafter, the incoming uncacheable instruction is reissued, the dedicated buffer is invalidated, and a fill buffer is simultaneously allocated to service the incoming uncacheable instruction. In a second scenario (Row 2), if an incoming cacheable load instruction "hits" the dedicated buffer, the data is forwarded to the processor core 208 when the dedicated buffer has valid data. If the request for the streaming load in the dedicated buffer is still in progress and the data has not yet been transferred from the bus controller 245 (i.e., data not valid), the incoming cacheable load is blocked.

In a third scenario (Row 3), if an incoming cacheable store instruction that "misses" the L1 cache "hits" a dedicated buffer, the incoming cacheable store is blocked until valid data is returned to the dedicated buffer and the data is written to the processor core 208. Thereafter, the incoming uncacheable instruction is reissued, the dedicated buffer is invalidated, and a fill buffer is simultaneously allocated to service the incoming cacheable store instruction. In a fourth scenario (Row 4), if an incoming cacheable prefetch instruction "hits" a dedicated buffer, the instruction is retired. Prefetch instructions retrieve and places data to a specified cache level (e.g., L1 cache, L2 cache, etc.) in anticipation of future use. In one embodiment, since the latency of the dedicated buffer 350 is substantially equal to that of the L1 cache 320, no data movement occurs. However, in another embodiment, the latency of the dedicated buffer may be greater than that of the L1 cache, in which case there may be data movement. This is a characteristic of prefetch instructions which does not move data when data is already closer to the processor.

Table 3 illustrates the behavior of incoming loads and stores upon "hitting" a dedicated buffer which supports streaming loads, cacheable non-temporal stores that "miss" the L1 cache, and uncacheable write combining stores (e.g., USWC). In Table 3, it is assumed that the dedicated buffer is in write combining mode (i.e., servicing a write combining store).

In a first scenario (Row 1), if the dedicated buffer is in write combining mode, incoming USWC stores write combine with the dedicated buffer. Any other uncacheable request will be blocked and evict the write combining buffer. Note that incoming USWC writes can only hit the dedicated buffer 350 if the dedicated buffer was originally allocated to service another USWC write because USWC is not memory aliased.

In a second scenario (Row 2), where the dedicated buffer is in write combining mode, the incoming cacheable load is blocked and causes eviction of the dedicated buffer. This is because the dedicated buffer does not forward data (e.g., to the processor core 208) when in write combining mode.

In a third scenario (Row 3), if the dedicated buffer is in write combining mode, incoming non-temporal stores combine with the dedicated buffer. Any other cacheable stores are blocked and evict the write combining buffer.

If the incoming instruction is a WB or WT non-temporal store that "misses" the L1 cache, but "hits" the dedicated buffer and the dedicated buffer is not in write combining mode (e.g., servicing a cacheable streaming load), the incoming store merges into the dedicated buffer, and the dedicated buffer switches to write-combining mode. In this case, the cacheable store instruction writes data (e.g., one, two, four, eight bytes) from the processor core 208 to the corresponding bytes in the dedicated buffer 350, the corresponding BW bits are set, the WCM and WCB control fields are set, and the GO control bit is cleared. The line of data brought from the bus controller 245 does not overwrite the bytes written from the processor core 208 on an incoming store instruction (in the case where the line of data is brought into the fill buffer after the bytes are written from the core). However, the bytes written from the processor core 208 do overwrite the corresponding bytes of the line of data brought into the fill buffer (in the case where the line of data is brought into the fill buffer before the bytes, are written from the core). The GO control field remains cleared while the dedicated buffer is in write combining mode. The dedicated buffer is then written to external memory 140 upon an eviction condition or when fully written.

As opposed to fill buffers, which only issue one request to the bus controller during the life of the fill buffer servicing a given operation, dedicated buffers can issue two requests if they support streaming loads and write combine stores, as described in the third scenario. For example, a dedicated buffer issues a request to the bus controller upon a non-temporal load "miss" to the L1 cache. Thereafter, if the dedicated buffer is "hit" by a cacheable non-temporal store, the GO (global observation) control bit is cleared and the WCM and WCB control fields are set. Upon an eviction condition, the dedicated buffer issues a second request to the bus controller to write the data to external memory and flush the L2 cache.

In a fourth scenario (Row 4), where the dedicated buffer is in write combining mode, the incoming cacheable prefetch is blocked and causes eviction of the dedicated buffer.

Dedicated buffers 350 respond to snoops once the buffer is globally observed. In another embodiment, if the dedicated buffer 350 supports write combining stores, the GO (global observation) control bit is cleared while the buffer is in write combining mode. As such, the dedicated buffer does not respond to external snoops (e.g., by another processor) until globally observed, which occurs as a consequence of an eviction condition or eviction due to the line being fully written (where the WCM control bit is cleared).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A processor comprising:
   a decoder to decode instructions; and
   a circuit, in response to a first decoded instruction, to,
      detect an incoming load instruction that misses a cache, the load instruction loading a data,
      allocate a first buffer to service the incoming load instruction, and
      issue a bus request to load the data in the first buffer without accessing said cache; and
   wherein the circuit, in response to a second decoded instruction, to,
      detect a cacheable store instruction that hits the buffer,
      invalidate the buffer when the buffer has completed the decoded instruction, and
      allocate a second buffer to service the cacheable store instruction.

2. The processor of claim 1 wherein the second buffer is a fill buffer.

3. The processor of claim 1 wherein the buffer is a dedicated buffer to exclusively service non-temporal load instructions.

4. A processor comprising:
   a decoder to decode instructions; and
   a circuit, in response to a first decoded instruction, to,
      detect an incoming load instruction that misses a cache, the load instruction loading a data,
      allocate a first buffer to service the incoming load instruction, and
      issue a bus request to load the data in the first buffer without accessing said cache; and
   wherein the circuit, in response to a second decoded instruction, to,
      detect a write back or write through store instruction that missed the cache and hit the buffer,
      switch the buffer to write combining mode, and
      merge the write back or write through store instruction with the buffer, and
   wherein the circuit, in response to a third decoded instruction, to,
      detect a cacheable load instruction that hits the buffer, cause the buffer to evict the data.

5. A processor comprising:
   a decoder to decode instructions;
   a circuit, in response to a first decoded instruction, to,
      detect an incoming store instruction that misses a cache, said incoming store instruction being one of a cacheable write back and a write through store instruction, and
      allocate a buffer in write combining mode; and
   wherein the circuit, in response to a second decoded instruction, to,
      detect an uncacheable instruction that hits the buffer,
      evict the buffer to write the buffer to memory, and
      block the uncacheable instruction until the buffer has been evicted.

6. A processor comprising:
   a decoder to decode instructions;
   a circuit, in response to a first decoded instruction, to,
      detect an incoming store instruction that misses a cache, said incoming store instruction being one of a cacheable write back and a write through store instruction, and
      allocate a buffer in write combining mode; and
   wherein the circuit, in response to a second decoded instruction, to,
      detect a cacheable load instruction that hits the buffer,
      evict the buffer to write the buffer to memory, and
      block the cacheable instruction until the buffer has been evicted.

7. A method comprising:
   decoding instructions;
   in response to a first decoded instruction,
      detecting an incoming load instruction that misses a cache, the load instruction loading a data,
      allocating a first buffer to service the incoming load instruction, and
      issuing a bus request to load the data in the first buffer without accessing said cache; and
   in response to a second decoded instruction,
      detecting a cacheable store instruction that hits the buffer,
      invalidating the buffer when the buffer has completed the decoded instruction, and
      allocating a second buffer to service the cacheable store instruction.

8. The method of claim 7 wherein the second buffer is a fill buffer.

9. The method of claim 7 wherein the buffer is a dedicated buffer to exclusively service non-temporal load instructions.

10. A method comprising:
    decoding instructions;
    in response to a first decoded instruction,
       detecting an incoming load instruction that misses a cache, the load instruction loading a data,
       allocating a first buffer to service the incoming load instruction, and
       issuing a bus request to load the data in the first buffer without accessing said cache; and
    in response to a second decoded instruction,
       detecting a write back or write through store instruction that missed the cache and hit the buffer,
       switching the buffer to write combining mode, and
       merging the write back or write through store instruction with the buffer; and in response to a third decoded instruction,
  detecting a cacheable load instruction that hits the buffer, and
  causing the buffer to evict the data.

11. A method comprising:
decoding instructions;
in response to a first decoded instruction,
  detecting an incoming store instruction that misses a cache, said incoming store instruction being one of a cacheable write back and a write through store instruction, and
  allocating a buffer in write combining mode; and
in response to a second decoded instruction,
  detecting an uncacheable instruction that hits the buffer,
  evicting the buffer to write the buffer to memory, and
  blocking the uncacheable instruction until the buffer has been evicted.

12. A method comprising:
decoding instructions;
in response to a first decoded instruction,
  detecting an incoming store instruction that misses a cache, said incoming store instruction being one of a cacheable write back and a write through store instruction, and
  allocating a buffer in write combining mode; and
in response to a second decoded instruction,
  detecting a cacheable load instruction that hits the buffer,
  evicting the buffer to write the buffer to memory, and
blocking the cacheable instruction until the buffer has been evicted.

13. A system comprising:
a memory to store instructions;
a processor coupled to the memory, the processor comprising:
a decoder to decode the instructions; and
a circuit, in response to a first decoded instruction, to,
  detect an incoming load instruction that misses a cache, the load instruction loading a data,
  allocate a first buffer to service the incoming load instruction, and
  issue a bus request to load the data in the first buffer without accessing said cache; and
wherein the circuit, in response to a second decoded instruction, to,
detect a cacheable store instruction that hits the buffer,
invalidate the buffer when the buffer has completed the decoded instruction, and
  allocate a second buffer to service the cacheable store instruction.

14. The system of claim 13 wherein the second buffer is a fill buffer.

15. The system of claim 13 wherein the buffer is a dedicated buffer to exclusively service non-temporal load instructions.

16. A system comprising:
a memory to store instructions;
a processor coupled to the memory, the processor comprising:
a decoder to decode instructions; and
a circuit, in response to a first decoded instruction, to,
  detect an incoming load instruction that misses a cache, the load instruction loading a data,
  allocate a first buffer to service the incoming load instruction, and
  issue a bus request to load the data in the first buffer without accessing said cache; and
wherein the circuit, in response to a second decoded instruction, to,
  detect a write back or write through store instruction that missed the cache and hit the buffer,
  switch the buffer to write combining mode, and
  merge the write back or write through store instruction with the buffer, and
wherein the circuit, in response to a third decoded instruction, to,
  detect a cacheable load instruction that hits the buffer,
  cause the buffer to evict the data.

17. A system comprising:
a memory to store instructions;
a processor coupled to the memory, the processor comprising:
a decoder to decode instructions; and
a circuit, in response to a first decoded instruction, to,
  detect an incoming store instruction that misses a cache, said incoming store instruction being one of a cacheable write back and a write through store instruction and
  allocate a buffer in write combining mode; and
wherein the circuit, in response to a second decoded instruction, to,
  detect an uncacheable instruction that hits the buffer,
  evict the buffer to write the buffer to memory, and
  block the uncacheable instruction until the buffer has been evicted.

18. A system comprising:
a memory to store instructions; and
a processor coupled to the memory, the processor comprising:
a decoder to decode instructions; and
a circuit, in response to a first decoded instruction, to,
  detect an incoming store instruction that misses a cache, said incoming store instruction being one of a cacheable write back and a write through store instruction, and
  allocate a buffer in write combining mode; and
wherein the circuit, in response to a second decoded instruction, to,
  detect a cacheable load instruction that hits the buffer,
  evict the buffer to write the buffer to memory, and
  block the cacheable instruction until the buffer has been evicted.

* * * * *